UNITED STATES PATENT OFFICE.

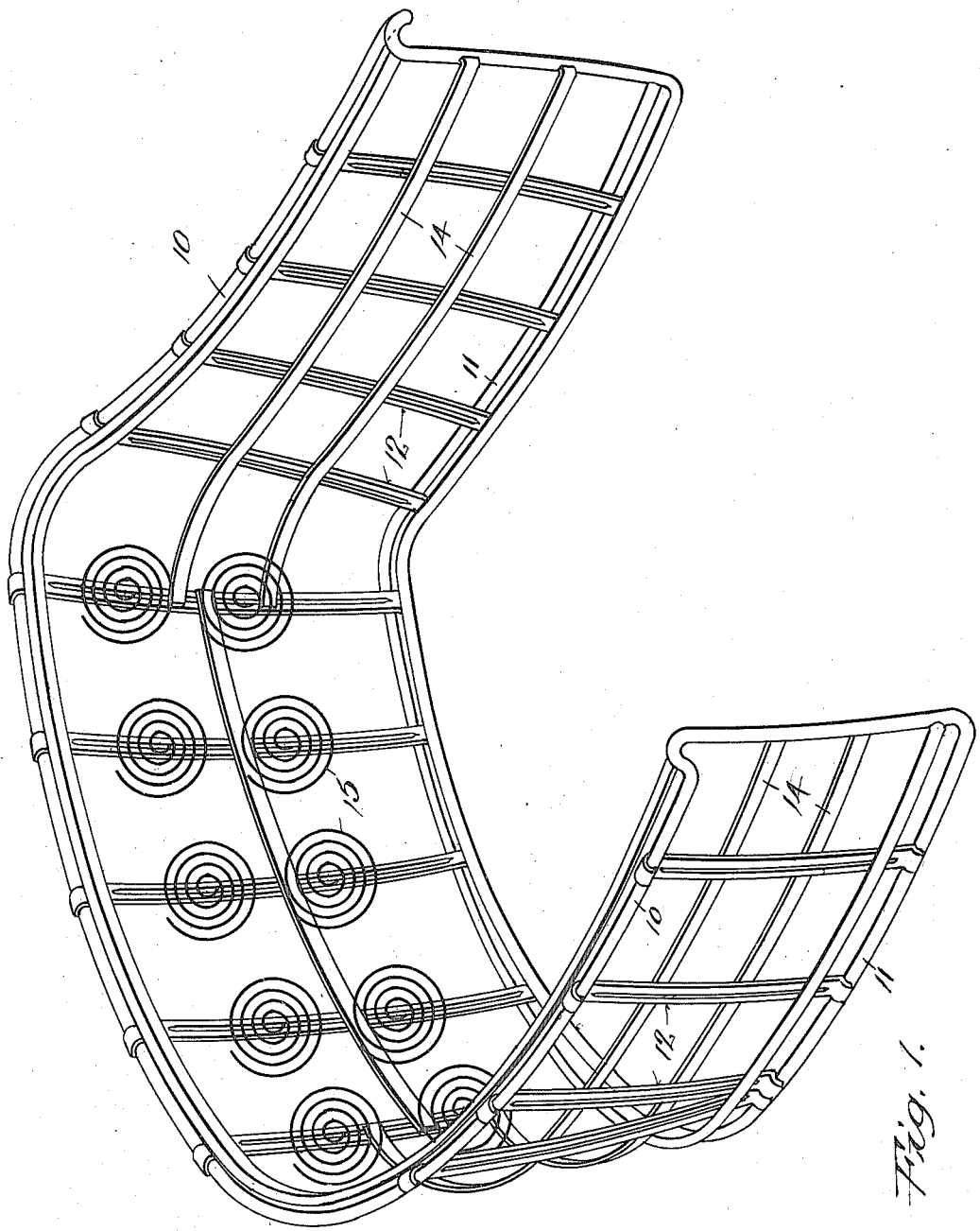

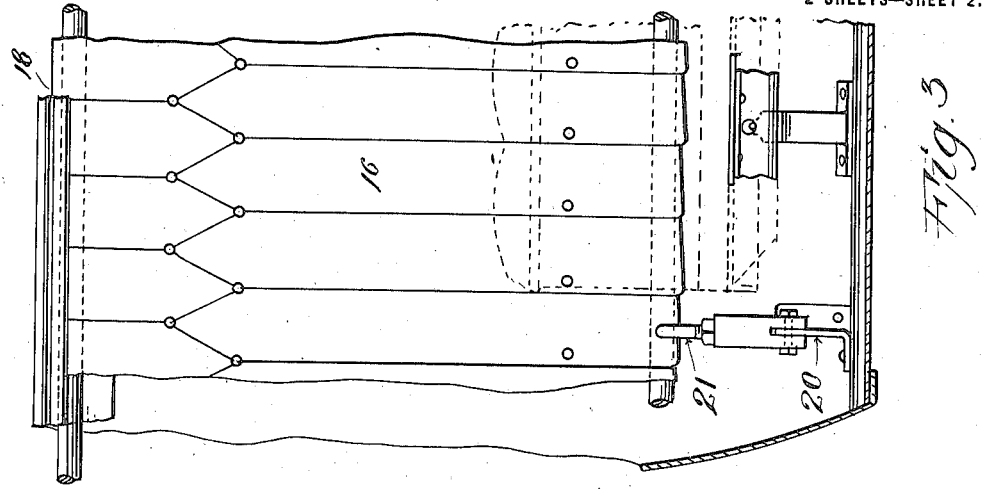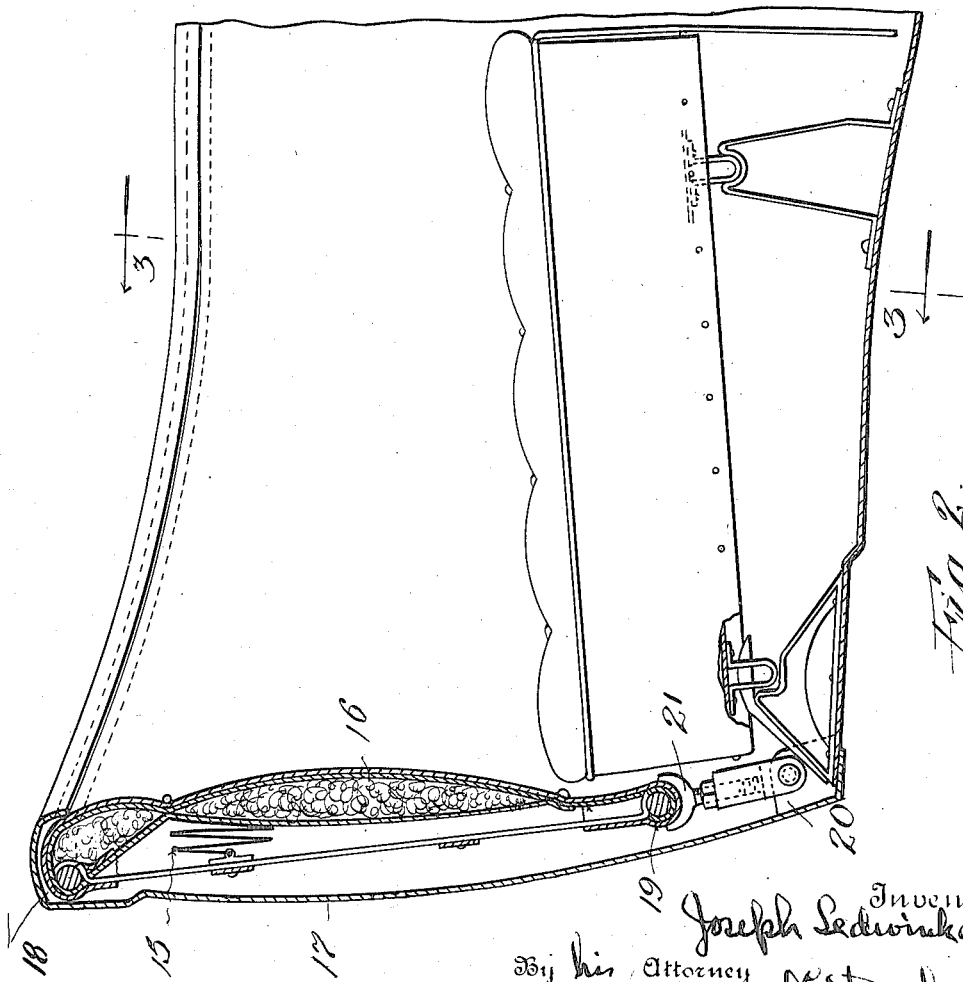

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

REMOVABLE UPHOLSTERY FOR VEHICLES.

1,255,323.          Specification of Letters Patent.      Patented Feb. 5, 1918.

Original application filed January 22, 1916, Serial No. 73,628. Divided and this application filed March 21, 1916. Serial No. 85,596.

*To all whom it may concern:*

Be it known that I, JOSEPH LEDWINKA, a citizen of the United States, residing at Philadelphia, in the county of Philadelphia, State of Pennsylvania, have made a certain new and useful Invention in Removable Upholstery for Vehicles, of which the following is a specification.

This invention relates to removable upholstery for vehicles and other purposes.

The object of the invention is to provide a cushion or upholstery unit for vehicles or other purposes which may be easily and readily removable from the vehicle body and replaced in place.

A further object of the invention is to provide a vehicle body structure having means to receive the upholstery or cushion frame and means for removably securing such frame in position.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the drawings:—

Figure 1 is a view in perspective of a cushion or upholstery frame unit of the required shape to form a seat back cushion for an automobile body, the upholstery being omitted.

Fig. 2 is a vertical central longitudinal sectional view of the rear seat portion of a vehicle body showing the seat back cushion or upholstery frame unit applied in place in accordance with my invention.

Fig. 3 is a broken view in front elevation, parts of the vehicle body being in vertical transverse section on the line 3, 3, Fig. 2.

The same part is designated by the same reference numeral wherever it occurs throughout the several views.

In my pending application Serial No. 56,967, filed Oct. 20, 1915, I have shown, described and claimed a structure of sheet metal vehicle body composed of stampings pressed to the required shape and contour and integrally united to form the body of an automobile, and wherein the upper edges of the seat back and side panels are formed with inverted channels to lend strength and rigidity to the body, although composed wholly of sheet metal stampings integrally secured together, to take and resist wholly in itself the stresses and strains of usage. In accordance with the present invention I propose to utilize the inturned inverted channels formed at the upper edges of the seat back and side portions in detachably securing the seat back cushion or upholstery. In carrying out my present invention I employ a seat back or cushion frame made up into a single unit and which may be applied to the body shell by inserting its upper edge into the inverted channel referred to, and and firmly, although detachably, pressing the same snugly into place in said channel, thus providing for the ready, easy and convenient removal and replacement of the cushion or upholstery frame. In carrying out my invention, in one form of embodiment thereof, I provide a cushion frame constructed as a unit and composed of the upper and lower members 10—11, which are bent into the general contour of the rear portion of an automobile body seat. These frame members are connected together by vertical metal bars 12, which are also connected together by cross members 14. The whole constitutes a flexible metallic frame unit which may be easily bent longitudinally into the proper contour of the side and back of the seat shell of an automobile or other vehicle body. Cushion springs 15 are attached to the cushion frame and over these springs and the frame the upholstery or trim is applied in any suitable or convenient manner as indicated at 16. The body seat back shell of the automobile is indicated at 17. The shell or panel 17 at its upper edge is formed into an inverted interiorly presenting channel 18, thereby forming a seat in which the upper edge of the cushion or upholstery frame may be received. In order to easily and readily detach, remove and replace the cushion frame unit with its upholstery or trim, I provide adjustable supports for the lower edge of said frame when applied to the shell. In the particular form shown, to which, however, my invention is not to be limited or restricted, threaded socket pieces 19 are pivotally connected adjacent the bottom edge of the body shell or to lugs 20 attached to the floor of the automobile body at suitable points directly beneath the inverted channel at the upper edge of the seat panel. Supporting forks 21 are mounted adjustably in the sockets 19, and these forks form seats to receive the lower edge of the cushion frame. When the cushion frame is to be applied to the body shell its upper edge is inserted in the inverted channel and its lower edge is seated in the fork arms 21. By suitably adjusting the fork arms in the socket pieces, the upper edge of the cushion frame unit is forced snugly and neatly home in the inverted channel and held in place therein by the forks or supports 21. By reversing this operation, that is, by backing off the supports 21, the cushion frame unit may be detached and removed. The structure described eliminates all wood parts heretofore commonly employed in connection with the upholstery or cushions of automobile bodies as well as the necessity for special constructions for securing the upholstery to the seat back panel of the body. It also enables the automobile body to be made up complete and the cushion frame unit with their trim or upholstery applied thereto to be made up and carried in stock, and such cushion frame unit is applied to the body when the latter is completed without requiring the body to be sent to a trim shop for the application of the upholstery or trim thereto. This greatly reduces the cost of manufacture of the complete body, as well as the amount of handling, and is exceedingly satisfactory in that the cushion units may be detached and removed or replaced whenever desired, thereby enabling the car owner to change the color or style of the upholstery or trim of his car, at will.

The subject matter set forth in this application is divided from my pending application Serial No. 73,628 filed Jan. 22, 1916.

While I have shown and described a specific structure of cushion or upholstery frame unit, it is to be understood that my invention is not to be limited or restricted to the details of structure and features shown and described.

Having now set forth the objects and nature of my invention, and a construction embodying the principles thereof, what I claim as new and useful and of my own invention, and desire to secure by Letters Patent, is—

1. An automobile body shell, including seat back and side portions made up of a sheet metal stamping pressed to the required shape and contour and having its upper edge turned inwardly and formed into an inverted channel, and an upholstery or cushion frame unit engaged at its upper edge in said channel and means to detachably press said upper edge upwardly into said channel.

2. An automobile body shell, including seat back and side portions made up of a sheet metal stamping pressed to the required shape and contour, and having its upper edge formed into an inwardly extended inverted channel, and a flexible upholstery or cushion frame unit and means to detachably press the upper edge of said cushion frame unit upwardly into said channel.

3. An automobile body shell, including seat back and side portions made up of a sheet metal stamping pressed to the required shape and contour and having its upper edge turned inwardly and formed into an inverted channel, and an upholstery or cushion frame unit having its upper edge received in said channel and means to vertically press and detachably retain said frame in position.

4. An automobile body shell, including seat back and side portions made up of a sheet metal stamping pressed to the required shape and contour and having its upper edge turned inwardly and formed into an inverted channel, and an upholstery or cushion frame unit having its upper edge received in said channel and a vertically adjustable support for the lower edge of said frame.

5. An automobile body shell, including seat back and side portions made up of a sheet metal stamping pressed to the required shape and contour and having its upper edge formed into an inverted channel, and an upholstery or cushion frame unit having its upper edge received in said channel, and a pivotally mounted longitudinal adjustable support for the lower edge of said frame.

6. An automobile body member having an inverted channel at its upper edge and a seat back cushion frame unit supported at its lower edge for vertical adjustment toward and removably received at its upper edge in said channel.

7. An automobile body having an inturned flange at its upper edge in combination with a seat back cushion frame unit and means to adjust its upper edge upwardly against said flange.

8. An automobile body having an inturned flange at its upper edge in combination with a seat back cushion frame unit and means to removably support the upper edge of said frame unit for vertical movement against said flange.

In testimony whereof I have hereunto set my hand in the presence of the subscribing witnesses, on this 14th day of March, A. D., 1916.

JOSEPH LEDWINKA.

Witnesses:
A. H. BUXBAUM,
L. R. HILYARD.